(12) United States Patent
Glaeske et al.

(10) Patent No.: US 9,984,114 B2
(45) Date of Patent: May 29, 2018

(54) FILTERING DATA IN AN ENTERPRISE SYSTEM

(71) Applicant: Microsoft Technology Licensing, LLC, Redmond, WA (US)

(72) Inventors: Brian R. Glaeske, Fargo, ND (US); Jason Green, Fargo, ND (US); Andrew Kies, Fargo, ND (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 312 days.

(21) Appl. No.: 14/503,732

(22) Filed: Oct. 1, 2014

(65) Prior Publication Data

US 2015/0347522 A1 Dec. 3, 2015

Related U.S. Application Data

(60) Provisional application No. 62/006,401, filed on Jun. 2, 2014.

(51) Int. Cl.
  *G06F 3/0482* (2013.01)
  *G06F 17/30* (2006.01)
  *G06F 3/0484* (2013.01)

(52) U.S. Cl.
  CPC ...... *G06F 17/30389* (2013.01); *G06F 3/0482* (2013.01); *G06F 3/04842* (2013.01); *G06F 17/30528* (2013.01); *G06F 17/30554* (2013.01); *G06F 17/30643* (2013.01)

(58) Field of Classification Search
  CPC ............... G06F 3/0482; G06F 3/04842; G06F 17/30554; G06F 17/30395; G06F 17/30528; G06F 17/30112; G06F 17/30643; G06F 17/30867; G06F 17/30699; G06F 17/30029; G06F 17/30696
  USPC ................. 707/722, 754, 999.007, 694, 752, 707/E17.138, E17.109, 732
  See application file for complete search history.

(56) References Cited

U.S. PATENT DOCUMENTS

| | | | | |
|---|---|---|---|---|
| 8,332,766 | B2 * | 12/2012 | Johnston | ............... G06F 19/322 707/722 |
| 8,671,106 | B1 | 3/2014 | Lee et al. | |
| 2006/0129914 | A1 * | 6/2006 | Ellis | ...................... G06F 17/246 715/275 |
| 2006/0277198 | A1 * | 12/2006 | Error | ................... G06F 17/3089 |
| 2008/0177703 | A1 * | 7/2008 | Dettinger | .......... G06F 17/30554 |
| 2009/0300544 | A1 | 12/2009 | Psenka et al. | |
| 2010/0083151 | A1 | 4/2010 | Lanza et al. | |
| 2013/0111393 | A1 | 5/2013 | John | |

OTHER PUBLICATIONS

International Preliminary Report on Patentability for International Patent Application No. PCT/US2015/033098, dated Aug. 9, 2016, date of filing: May 29, 2015, 9 pages.

(Continued)

*Primary Examiner* — Robert W Beausoliel, Jr.
*Assistant Examiner* — Pedro J Santos
(74) *Attorney, Agent, or Firm* — Christopher J. Volkmann; Kelly, Holt & Christenson, PLLC

(57) ABSTRACT

A collection of data is displayed. A filter user input is received from a user in order to filter the data. The filter user input can be on a grid-based filter, it can be on a filter pane, or on a column header filter. The data is filtered, based upon the filter user input, and the filtered data is displayed.

20 Claims, 22 Drawing Sheets

(56) References Cited

OTHER PUBLICATIONS

"International Search Report & Written Opinion Issued in PCT Application No. PCT/US2015/033098", dated Sep. 10, 2015, 9 Pages.

"EnterpriseOne Supply Chain Planning Demand Management 8.12 Consensus Conference Room Implementation Guide", Published on: Jun. 2006, Available at: http://docs.oracle.com/cd/E10931_01/jded/acrobat/E1_SCP812SCR-B_0606.pdf EnterpriseOne Demand Management Overview.

Vereshchagin, Sergey, "Some New Features in version 4.1 Cloud ERP", Published on: Jul. 3, 2013, Available at: http://blog.acumatica.com.sg/2013/07/some-new-features-in-version-41.html.

"OpenERP 7.0 Release Notes", Published on: Nov. 14, 2012, Available at: http://v6.openerp.com/node/1272.

Trix, Grey, "How to Search on Multiple Fields in Sage 300 ERP", Punlished on: Oct. 25, 2013, Available at: http://www.greytrix.com/blogs/sageaccpacerp/2013/10/25/how-to-search-on-multiple-fields-in-sage-300-erp.

Smith, Paula, "How to Use filters in Sage 100 ERP", Published on: Mar. 18, 2014, Available at: http://www.dsdinc.com/2014/03/how-to-use-filters-in-sage-100-erp/.

"Filtering GP Smartlists", Retrieved on: Apr. 25, 2014, Available at: http://gpworking.com/filtering-gp-smartlists/.

"Acumatica ERP 4.2 User Guide", Retrieved on: Apr. 25, 2014, Available at: http://builds.acumatica.com/builds/4.11/PDF/AcumaticaERP_4.2_CommonSettings.pdf.

"Acumatica—Products", Retrieved on: Apr. 24, 2014, Available at: http://www.acumatica.com/products/videos/category/products/P18.

"Faceted search", Retrieved on: Apr. 28, 2014, Available at: http://en.wikipedia.org/wiki/Faceted_search.

Second Written Opinion for International Patent Application No. PCT/US2015/033098, dated May 13, 2016, date of filing: May 29, 2015, 8 pages.

"Office Action Issued in European Patent Application No. 15729652.6", dated Feb. 7, 2018, 7 Pages.

\* cited by examiner

| CUSTOMER | | |
|---|---|---|
| FIRST NAME | LAST NAME | PHONE |
| John | Doe | (###) ###-#### |
| Jane | Deere | (###) ###-#### |
| Jon | Doe1 | (###) ###-#### |
| Jan | Deere1 | (###) ###-#### |
| John | Doe2 | (###) ###-#### |
| Jane | Deere2 | (###) ###-#### |

RENTAL
FILTERS

Vehicle rental ID is ▶

Start date is ▶

End date is ▶

Status is ▶
Ready for pickup

Add a filter field ▶

Apply      Clear

190

164 — Phil

VEHICLE ID    VEHICLE       START DATE                  END DATE
0000016       ACME_Doe      05/13/2014 08:35:57 AM      05/14/2014 08:35:

192

FILTERING DATA IN AN ENTERPRISE SYSTEM

CROSS-REFERENCE TO RELATED APPLICATION

The present application is based on and claims the benefit of U.S. provisional patent application Ser. No. 62/006,401, filed Jun. 2, 2014, the content of which is hereby incorporated by reference in its entirety.

BACKGROUND

Computer systems are currently in wide use. Some computer systems are relatively large, and are deployed on an enterprise-wide basis.

By way of example, some such computer systems include business systems. Business systems can include, for instance, enterprise resource planning (ERP) systems, customer relations management (CRM) systems, line-of-business (LOB) systems, among others. Other enterprise systems can include document management systems, messaging systems, schedule and calendar management systems, among a wide variety of other systems.

The discussion above is merely provided for general background information and is not intended to be used as an aid in determining the scope of the claimed subject matter.

SUMMARY

A collection of data is displayed. A filter user input is received from a user in order to filter the data. The filter user input can be on a grid-based filter, it can be on a filter pane, or on a column header filter. The data is filtered, based upon the filter user input, and the filtered data is displayed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 3A-3L are examples of user interface displays.

DETAILED DESCRIPTION

Figure 1:
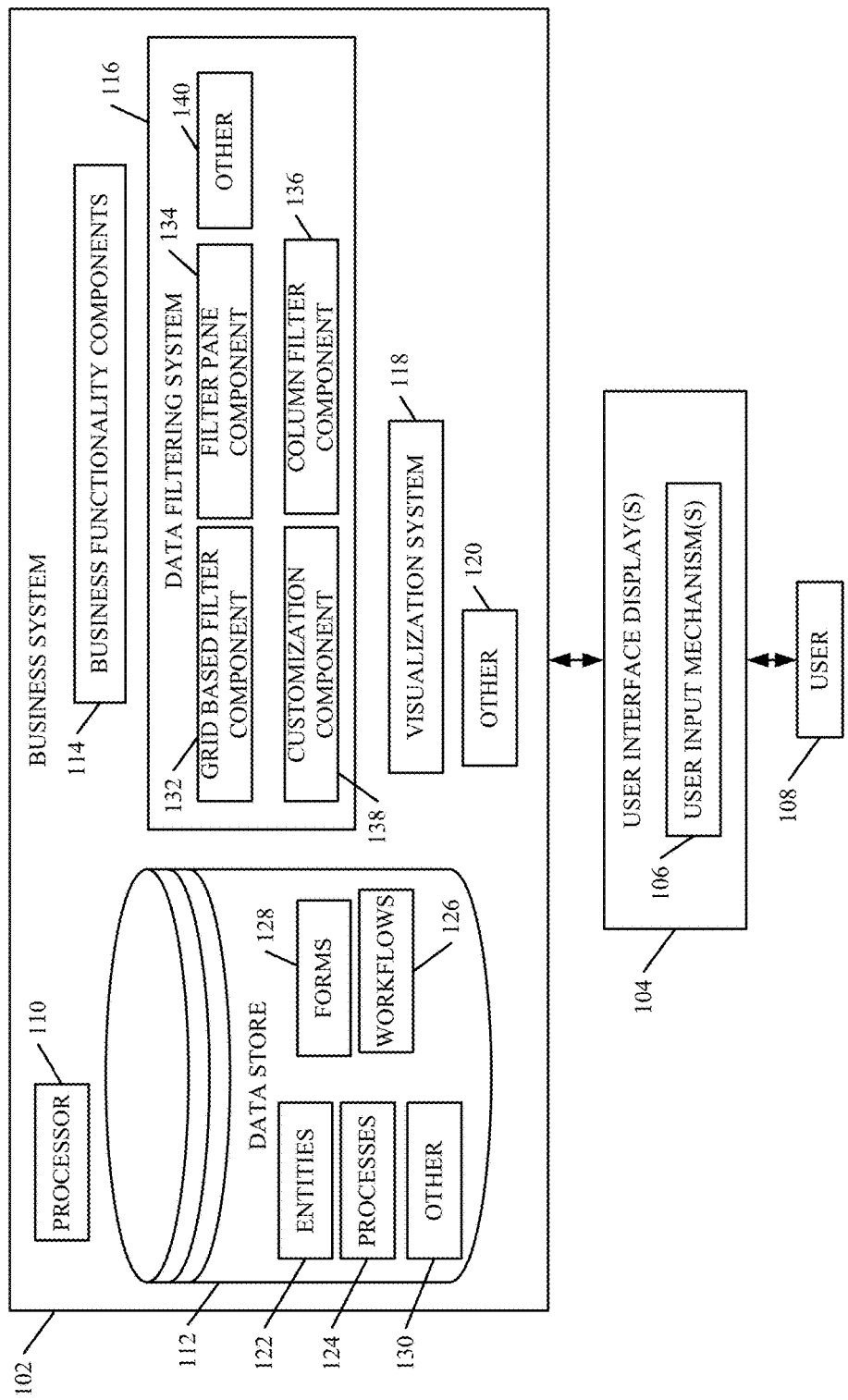
FIG. 1 is a block diagram of one example computer system.

FIG. 1 shows a block diagram of one example of an enterprise computing system 100. In the example shown in FIG. 1, system 100 includes business system 102. Business system 102 illustratively generates user interface displays 104 with user input mechanisms 106 for interaction by user 108. User 108 illustratively interacts with user input mechanisms 106 to control and manipulate business system 102.

In the example shown in FIG. 1, business system 102 illustratively includes processor 110, data store 112, business functionality components 114, data filtering system 116, visualization system 118, and it can include other items 120 as well. Data store 112, itself, illustratively includes entities 122, processes 124, workflows 126, forms 128, and it can include other business records or other business data 130. Data store 112 illustratively stores the data for business system 102.

Entities 122 illustratively represent various different entities that are defined within business system 102. For instance, a customer entity describes and defines a customer. A vendor entity describes and defines a vendor. A sales order entity describes and defines a sales order. A business opportunity entity describes and defines a business opportunity. This is a small set of example entities, and a wide variety of other entities can be used as well. In addition, while the present discussion proceeds with respect to some business records being described as entities, they can be other types of business records as well.

Forms 128 illustratively represent various data within data store 112, and are used as a mechanism by which to present the data on a user interface display 104 to user 108. The forms can include entities 122 and other data records, and they can also include a wide variety of different types of controls, such as text fields, buttons, check boxes, links, icons, navigation elements, etc.

Business functionality components 114 illustratively run various processes 124 and workflows 126, using the data stored in data store 112, in order to allow user 108 to perform tasks to accomplish the business of the organization that deploys business system 102. Business functionality components 114 can, for example, include general ledger applications or a wide variety of other accounting applications. They can also include inventory tracking applications, vendor interaction applications, business opportunity tracking applications, or a wide variety of other applications that can be used by the organization that deploys business system 102.

Data filtering system 116 illustratively includes grid-based filter component 132, filter pane component 134, column filter component 136, customization component 138, and it can include other items 140 as well. Grid-based filter component 132 illustratively provides and controls a grid-based filter (or quick filter) that allows user 108 to quickly filter based on various fields in a grid. Filter pane component 134 illustratively provides and controls a filter pane that allows user 108 to filter on a plurality of different fields, using different filter criteria. Column filter component 136 illustratively provides and controls a column header filter that is provided at the head of various columns on various forms 128. It allows user 108 to filter the corresponding column based on various filter criteria. Customization component 138 illustratively allows user 108 to customize his or her filters.

Visualization system 118 illustratively generates user interface displays 104, either by itself, or under the control of other items in business system 102. Some examples of the user interface displays 104 are provided below.

Figure 2A:
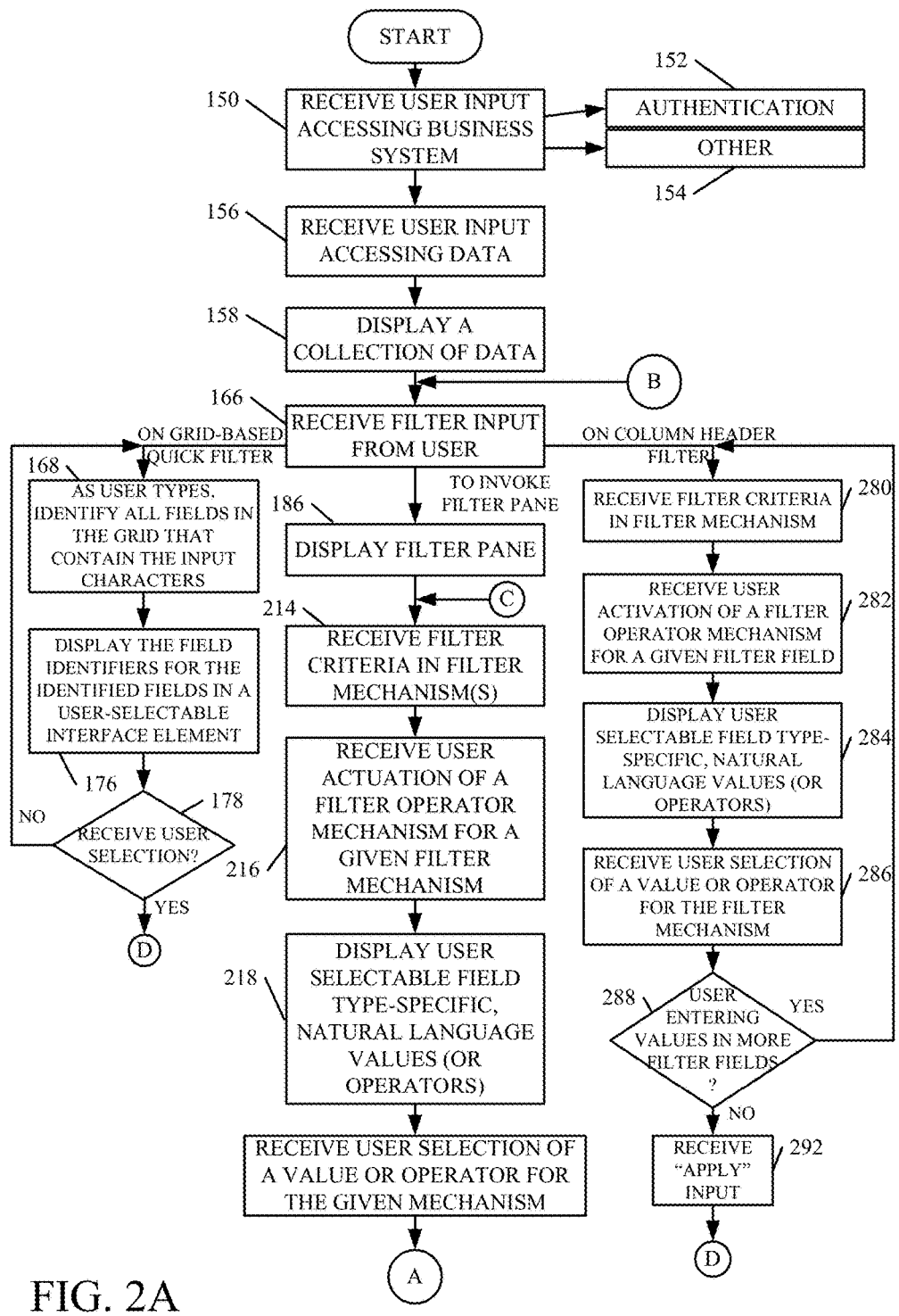
FIGS. 2A-2B (collectively FIG. 2) show a flow diagram illustrating one example of the operation of the system shown in FIG. 1 in filtering data.
Figure 2B:
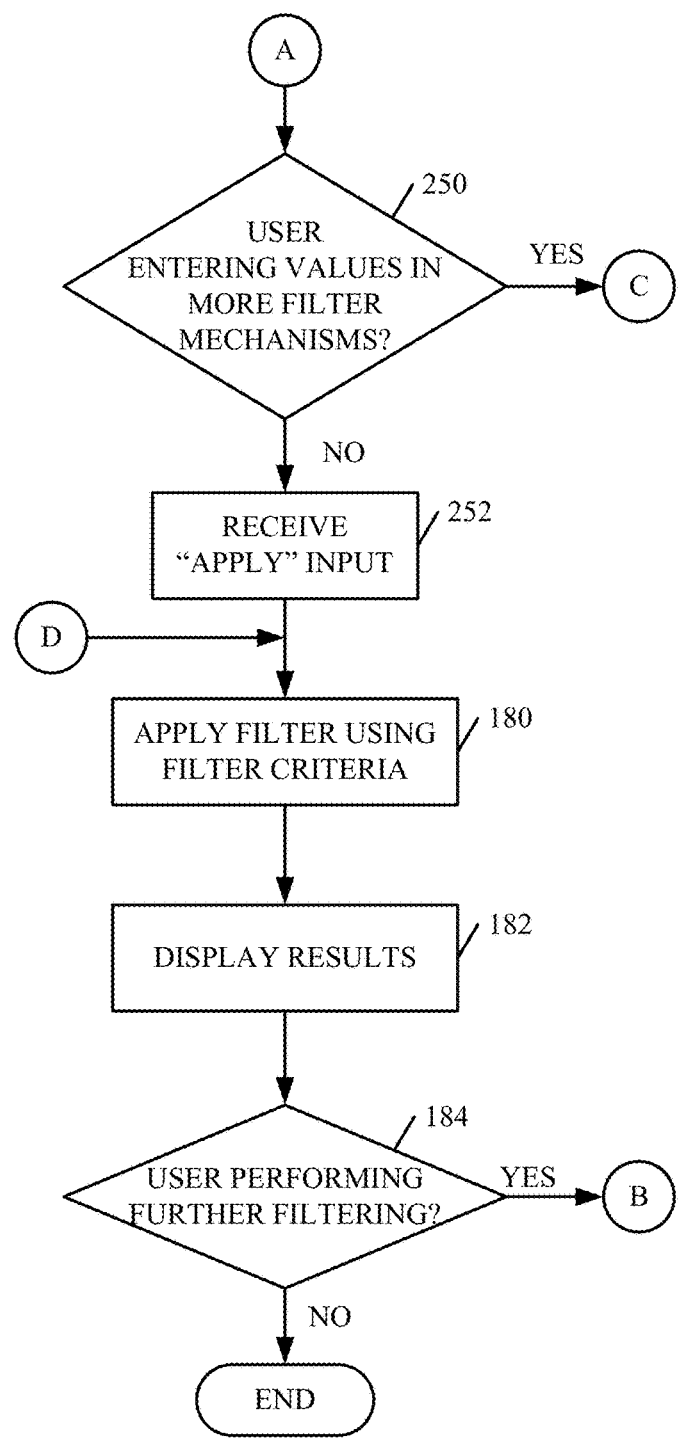
Figure 3B:
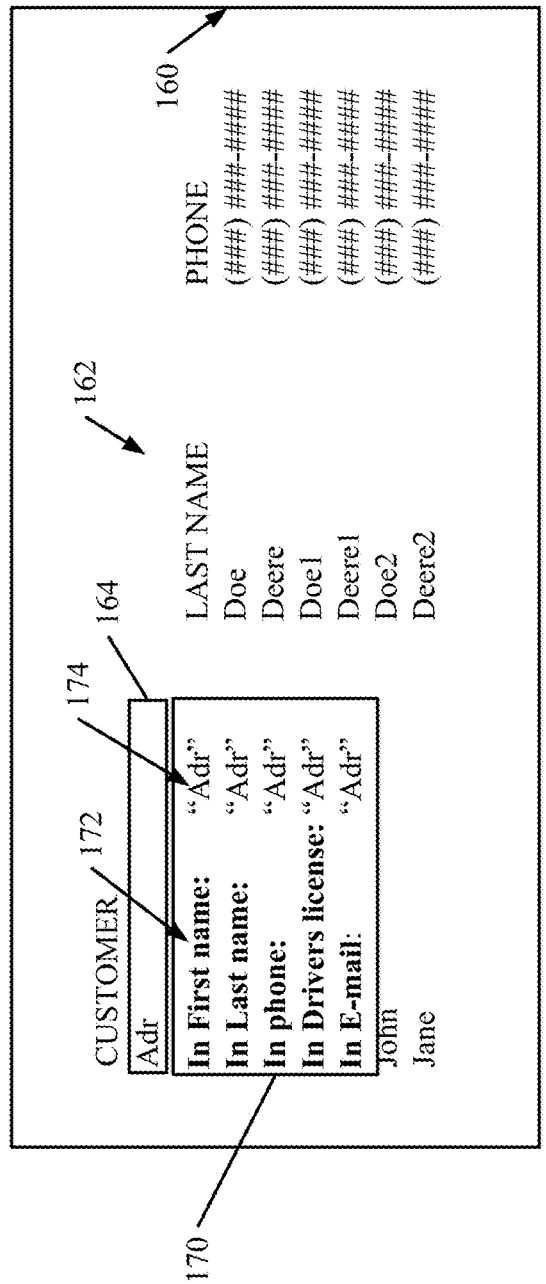

FIGS. 2A and 2B (collectively FIG. 2) show a flow diagram illustrating one example of the operation of the enterprise system 100 shown in FIG. 1, in performing filtering operations. FIGS. 3A-3M show one example set of user interface displays. FIGS. 2-3M will now be described in conjunction with one another.

System 102 first receives user inputs from user 108 accessing business system 102. This is indicated by block 150 in FIG. 2. This can take a wide variety of different forms. For instance, user 108 can provide inputs to an authentication system in business system 102 that authenticates user 108 using various authentication mechanisms. This is indicated by block 152. Receiving the user inputs can be in other forms as well, and this is indicated by block 154.

In response, system 102 illustratively generates user interface displays 104 that allow user 108 to access business system 102. User 108 then provides user inputs indicating that user 108 wishes to access data in system 102. This is indicated by block 156. For instance, the user can provide an input through a user input mechanism 106 requesting that a particular form 128 be displayed. The user can also indicate that he or she wishes to access data by conducting a search within system 102, or the user can navigate to data within a file system or using other mechanisms. Receiving the user input accessing data can be performed in other ways as well.

In response, visualization system 118 illustratively displays a collection of data. This is indicated by block 158. In the present description, the collection of data will be referred to as a grid. In the present discussion, a grid will be shown as data displayed in tabular form where a plurality of data elements are listed in one or more rows and one or more columns The data is also shown as being displayed in one or more fields. It will be appreciated, however, that this is only one example of a collection of data that is referred to as a grid. Other data structures and other data collections can be used as well.

FIG. 3A shows one example of a user interface display 160 that displays a form. The form illustratively includes a table 162 of data. The data includes a set of columns labeled First Name, Last Name, Phone, etc. The table also includes a set of rows of fields that contain the actual data entries in the table. Thus, the grid is represented by the table shown generally at 162. User interface display 160 also shows a grid-based filter mechanism 164. In the example shown in FIG. 3A, the grid-based filter mechanism 164 is a text box that receives textual inputs from user 108 that act as filter criteria. This is described in greater detail below.

Referring again to the flow diagram of FIG. 2, filter system 116 then receives a filter input from user 108, indicative of the user 108 providing criteria by which to filter the data displayed in the grid. Receiving the filter input is indicated by block 166 in FIG. 2.

It will be noted that the filter input can take a variety of different forms. It can be an input into the grid-based filter mechanism 164 shown in FIG. 3A, it can be input invoking a filter pane (discussed in greater detail below with respect to FIGS. 3C-3J), or it can be on a column header filter as described in greater detail below with respect to FIGS. 3K-3L. The discussion will initially proceed with respect to the user providing a filter input into grid-based filter mechanism 164 shown in FIG. 3A.

In the example shown in FIG. 3B, the user begins typing text into filter mechanism 164. As the user types text, grid-based filter component 132 identifies all fields in the grid 162 that contain the input characters. In one embodiment, for instance, grid-based filter component 132 searches all of the fields displayed in grid 162 to perform a textual match against the characters typed into filter mechanism 164 and identifies the columns in grid 162 that contain fields with the typed characters. This is indicated by block 168 in FIG. 2.

Grid-based filter component 132 then controls visualization system 118 to display the column (or field) identifiers that identify the fields in grid 162 that contain the letter string (or character string) entered into filter mechanism 164, thus far, by user 108. In doing so, grid-based filter component 132 illustratively displays the identified columns (that contain matching fields) in a user-selectable interface element. One example of this is shown in FIG. 3B.

FIG. 3B shows a user interface display that is similar to user interface display 160 shown in FIG. 3A, and similar items are similarly numbered. However, FIG. 3B also shows that grid-based filter component 132 has controlled visualization system 118 to display drop down menu 170. Drop drown menu 170 is one example of a user interface display element that shows the fields or columns within grid 162 that contain the letter string (or other character string) that the user has typed into filter mechanism 164. It can be seen in the example shown in FIG. 3B that drop down menu 170 identifies the particular field or column with a field or column identifier shown generally at 172. It also illustrates that the identified field or column corresponding to identifier 172 includes the letter string (or other character string) that the user has typed into filter mechanism 164, and this is illustrated generally by 174.

For instance, the first element in drop down menu 170 states "In First Name: 'Adr'". Thus, the first portion of the end tree "In First Name:" identifies the particular field or column that contains the character string.

Each of the entries in drop down menu 170 is illustratively a user selectable item. Therefore, the user can select one of the items in drop down menu 170, and grid-based filter component 132 filters the displayed grid 162 to show only entries in grid 162 for which the character string that the user has entered in filter mechanism 164 appears in the identified field or column. By way of example, if the user were to select the first entry in drop down menu 170, then grid-based filter component 132 filters the data displayed in grid 162 so that it only displays entries for which the character string entered in filter mechanism 164 appeared in the "First Name" column or field. In the specific example shown in FIG. 3B, grid-based filter component 132 would filter the display so that it showed only entries where the "First Name" column contained the letter string "Adr". Displaying the field identifiers for the identified fields or columns as a user-selectable interface element is indicated by block 176 in the flow diagram of FIG. 3, and receiving user selection of one of those items is indicated by block 178.

Once the user has selected one of the items, then the filter criteria that can be used to filter the data displayed in grid 162 include not only the character string entered in filter mechanism 164, but the field or column identified in the selected element in drop down menu 170. For instance, the filter criteria (if the user selected the first entry in drop down menu 170) would include the column name "First Name" and the character string "Adr". Thus, grid-based filter component 132 uses those filter criteria and displays only entries in grid 162 for which the character string "Adr" occurs in the "First Name" field or column Applying the filter using the selected filter criteria is indicated by block 180 in FIG. 2. Displaying the filtered results is indicated by block 182.

It may be that user 108 wishes to perform further filtering. If so, processing reverts to block 166. If not, then filtering system 116 has, for the present time, completed its filtering operations. This is indicated by block 184 in FIG. 2.

Referring again to block 166 in FIG. 2, it may be that the filter input received from user 108 is an input detected by filter pane component 134 that invokes the display of a filter pane. In response, filter pane component 134 illustratively displays a filter pane. This is indicated by block 186 in FIG. 2.

Figure 3C:
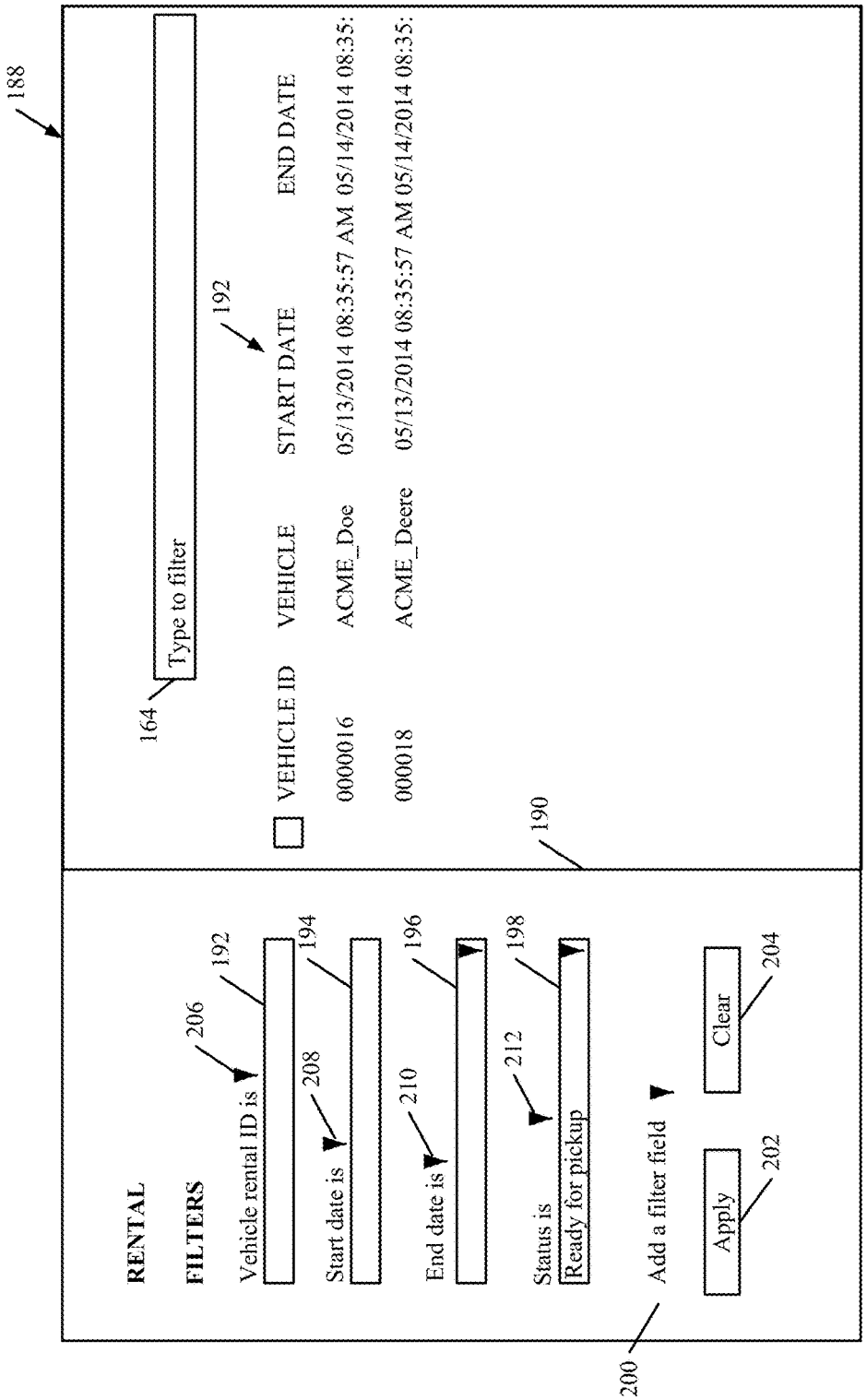

FIG. 3C shows one example of a user interface display 188 on which one example of a filter pane 190 is displayed. In the example shown in FIG. 3C, the user has illustratively provided a user input requesting that filter pane component 134 to display filter pane 190. For instance, user 108 may provide a swipe input swiping on a touch-sensitive user display device. This gesture may indicate to filter pane component 134 that user 108 wishes to have filter pane 190 displayed.

It can be seen that in the example shown in FIG. 3C, the user interface display 188 illustratively includes a grid (or collection of displayed data) 192. The grid is again displayed in tabular form including a plurality of columns and a plurality of rows. Data is entered into each of the rows, by entering it in fields under each of the columns Display 188 also illustratively includes a grid-based filter mechanism 164. Filter mechanism 164 illustratively operates in a similar way to that described above with respect to FIG. 3B.

In one example, when the user has invoked filter pane 190, filter pane 190 is illustratively moved in from the left hand side of display 188, and it illustratively pushes the content of grid 192 to the right on the display. In the example shown in FIG. 3C, filter pane 190 illustratively includes a plurality of different filter input mechanisms 192, 194, 196, and 198. Each of the filter user input mechanisms 192-198 illustratively corresponds to a field or column in grid 192. Thus, it can be seen that filter mechanism 192 corresponds to the vehicle rental ID column shown in grid 192. Filter mechanism 194 corresponds to the start date column in grid 192, and mechanisms 196 and 198 correspond to the end date and status columns in grid 192, respectively.

In the example shown in FIG. 3C, filter pane 190 also includes an Add user input mechanism 200. This allows user 108 to add additional filter input mechanisms corresponding to additional fields or columns in grid 192. When the user actuates mechanism 200, for instance, filter pane component 134 illustratively generates a user input mechanism (such as a drop down menu or another mechanism) that allows user 108 to select an additional portion of grid 192 for which to add a filter mechanism. It will be noted that while filter pane 190 shows filter mechanisms for different fields or columns in grid 192, filter mechanisms can be added to other items as well. Adding a filter mechanism corresponding to a field or column in a grid is only one example.

In the example shown in FIG. 3C, filter pane 190 also illustratively includes an Apply user input mechanism 202 and a Clear user input mechanism 204. Once the user has entered filter criteria in the various mechanisms 192-198, the user can actuate the Apply input mechanism 202 to have filter pane component 134 apply the filter criteria to the grid 192 and display the filtered results. User 108 can actuate the Clear mechanism 204 to clear the values entered in the various filter mechanisms 192-198.

FIG. 3C also shows that, in one example, each filter mechanism 192-198 includes a filter operator selection mechanism 206, 208, 210 and 212, respectively. Mechanisms 206-212 allow the user to select logical operators as filter criteria. Thus, the user can enter filter criteria by not only entering characters into mechanisms 192-198, but by choosing various logical operators that are displayed when the user actuates mechanisms 206-212. Receiving filter criteria (such as by receiving a character string input by user 108) at one or more of the filter mechanisms is indicated by block 214. Receiving user actuation of a filter operator selection mechanism 206-212 corresponding to a given filter mechanism 192-198 is indicated by block 216.

In one example, when the user actuates a filter operator selection mechanism 206-212, filter pane component 134 generates a display that allows the user to select from a plurality of different, acceptable, operators. In one example, the operators are natural language operators (instead of, for instance, mathematical symbols) and are field type-specific operators. For instance, if the field corresponds to a date, then the selectable operators displayed for that filter mechanism may be different than if the field corresponds to a currency or a name, for instance. Displaying user selectable field type-specific natural language values (or operators) is indicated by block 218 in FIG. 2. A number of examples will now be described.

Figure 3D:
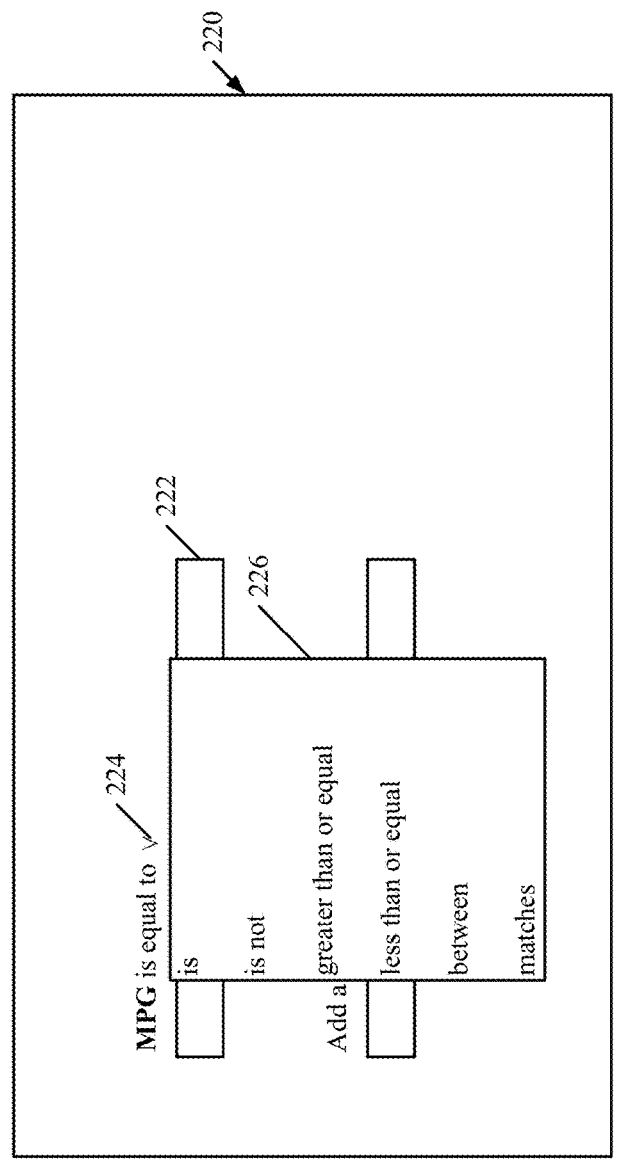

FIG. 3D shows an example of one illustrative portion of a filter pane 220. Filter pane 220 illustratively includes a filter mechanism 222 which corresponds to miles per gallon (MPG), which is an integer. Mechanism 222 has a corresponding operator selection mechanism 224 that can be actuated by user 108 in order to select an operator to be used along with the integer. Thus, the type-specific values displayed in drop down menu 226 are those that can be used with integer values. For instance, in the example shown, the operators include "is", "is not", "greater than or equal", "less than or equal", "between", and "matches". User 108 can thus easily enter characters into field 222 and select operators from drop down menu 226 by actuating operator mechanism 224. The user will be presented with operators that are specifically chosen based on the type (e.g., integer) of data to be entered in filter mechanism 222.

Figure 3E:
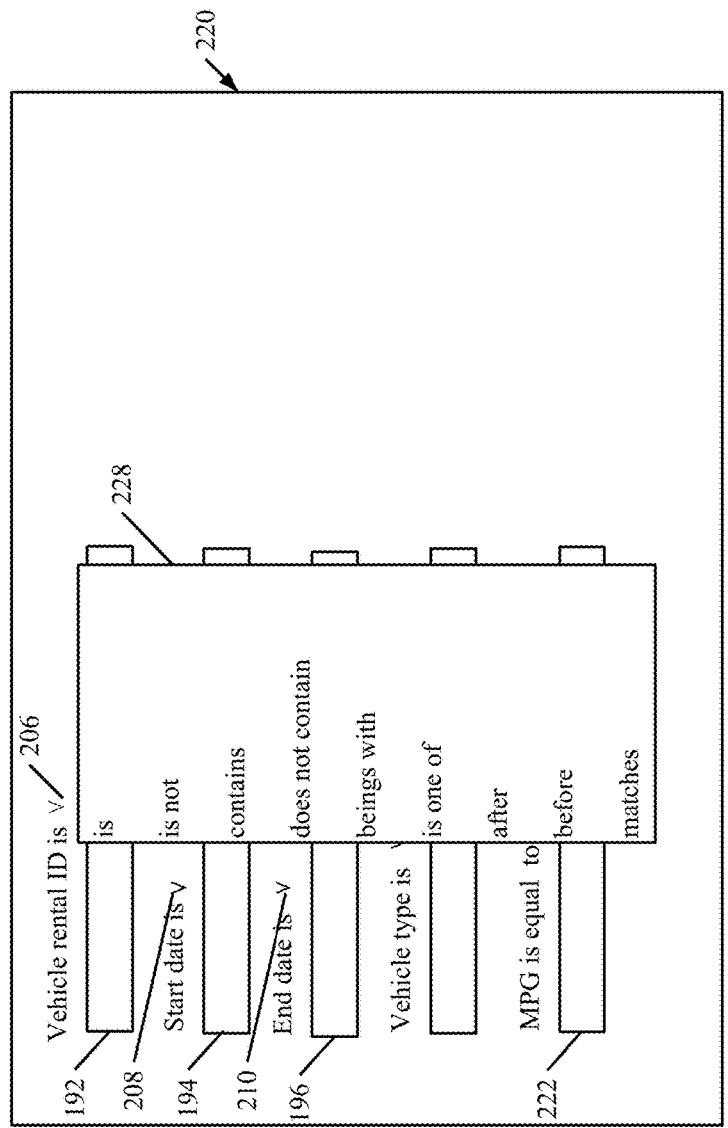

FIG. 3E shows another example in which user 108 has actuated the filter operator mechanism 206 for the vehicle rental ID filter mechanism 192. The expected value input into the text field of mechanism 192 is a string. Therefore, filter pane component 134 displays operators in drop down menu 228 that correspond to a string. It can be seen that the selectable elements in drop down menu 228 are type-specific (that is, string-specific) natural language values or operators that can be selected by user 108 to operate in conjunction with the characters entered into mechanism 192.

Figure 3F:
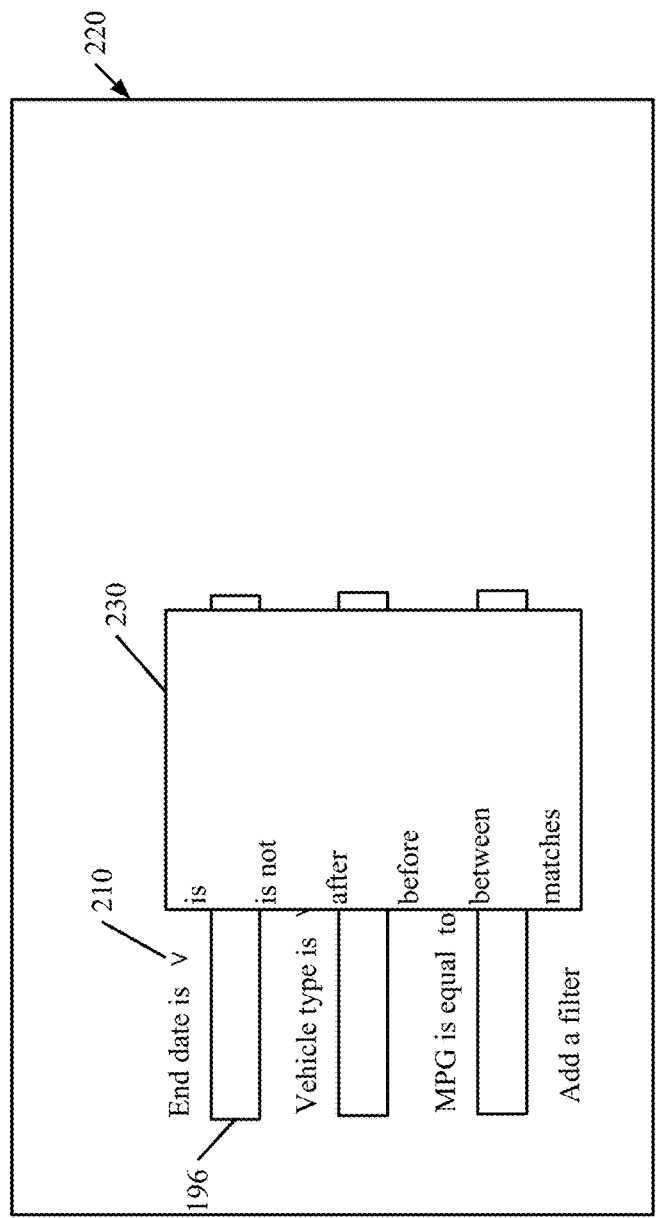

FIG. 3F shows an example of operators that can be presented to the user for a date field. When the user actuates mechanism 210, the operators are displayed in drop down menu 230. They are suitable for operating on a date value. The example operators shown are "is, "is not", "after", "before", "between", and "matches."

Figure 3G:
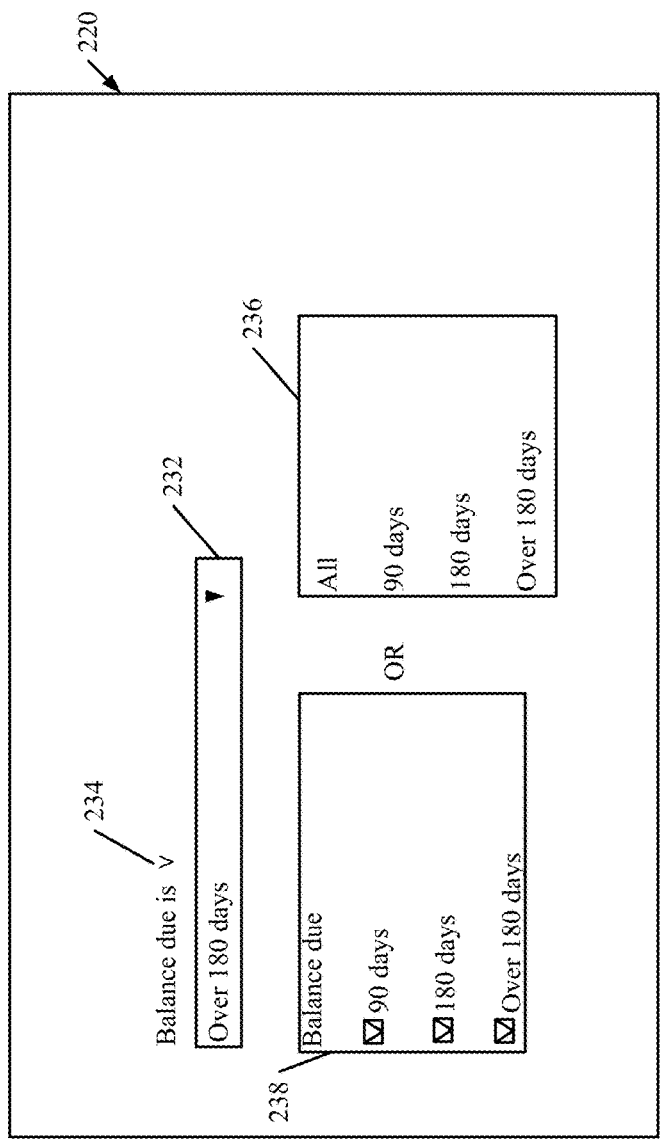

FIG. 3G shows two different examples where the field type is an enumerator. In FIG. 3G, it can be seen that filter mechanism 232 corresponds to a "balance due" amount. Operator selection mechanism 234 can be actuated to select one or more different operators. In the example shown in FIG. 3G, a first drop down menu 236 can be generated, and it contains values in the same fashion as those discussed above. That is, the values for the operators are specific to the enumerator type of data field. Thus, the user can select "All", "90 Days", "180 Days", or "over 180 Days".

Alternatively, FIG. 3G also shows another example in which, instead of drop down menu 236, another drop down menu 238 is displayed. Menu 238 allows the user to select multiple different options for values of the operators to be applied to the characters entered into mechanism 232. Each of the selectable options is associated with a check box or other selectable mechanism that allows user 108 to select that particular operator to be applied as filter criteria.

Figure 3H:
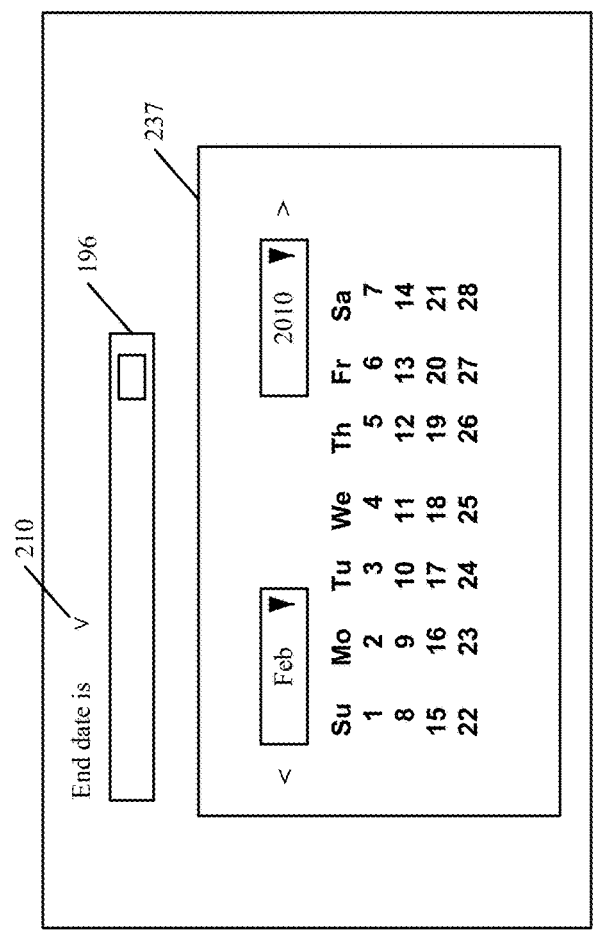

FIG. 3H shows another example in which the user has actuated mechanism 210 for selecting an operator to be applied to a date field. In the example shown in FIG. 3H, the user is presented with a date picker user interface mechanism 237. The user can select the date filter criteria using mechanism 237.

Referring again to the flow diagram of FIG. 2, it will be noted that, in one example, user 108 can enter filter criteria using a plurality of different filter mechanisms 192-198 on a filter pane 190. When the user does this, all of the entered filter criteria will operate together in filtering the data in the grid. This is indicated by block 250 in FIG. 2.

When the user has completed entering filter criteria, the user 108 illustratively provides an input indicating to filter pane component 134 that the filter should be applied. Receiving an "Apply" input is indicated by block 252 in FIG. 2. In the example shown in FIG. 3C, this can be done by having the user simply actuate mechanism 202.

In response to receiving a user input indicating that the filter criteria should be applied, filter pane component 134 illustratively applies all of the filter criteria that the user has input on filter pane 190. For instance, referring to FIG. 3C, it can be seen that the user has entered the text "ready for pickup" into the Status filter mechanism 198. That is the only entry on filter pane 190. Thus, in that example, filter pane component 134 illustratively identifies the "Status" field or column in grid 192 and compares the value in each of the entries in that column to determine whether the corresponding status is "ready for pickup". It identifies those particular records that have that status value and filters out the rest of the data displayed on grid 192. It displays the remaining results. This is indicated by block 180 and 182 in the flow diagram of FIG. 2.

Figure 3I:
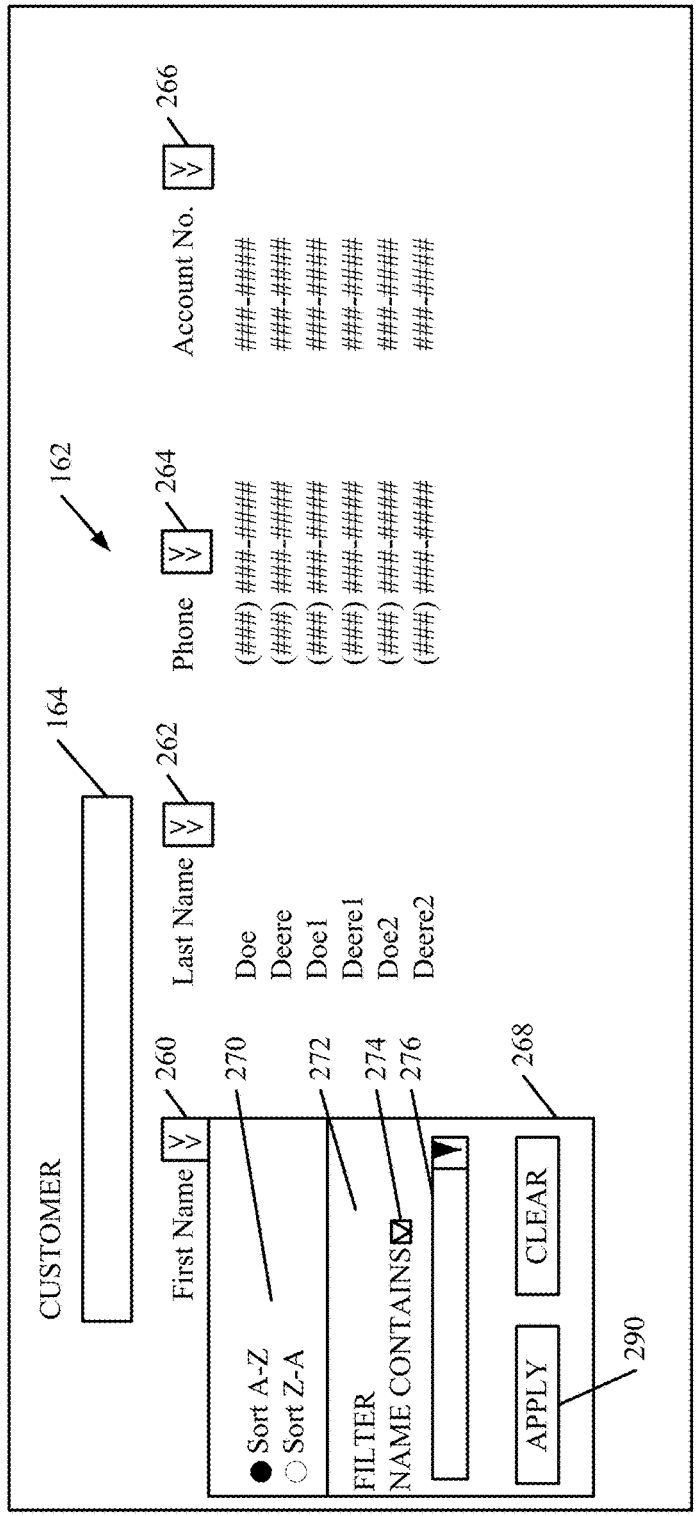

Referring again to block 166 in FIG. 2, it may be that the filter input received by user 108 is received on a column filter component. By way of example, column filter component 136 can generate a column filter corresponding to each column in the grid shown in FIG. 3A. One example of this is illustrated in FIG. 3I which shows that each of the columns in grid 162 has an associated column filter mechanism 260, 262, 264 and 266. When the user actuates a column filter mechanism 260-266, column filter component 136 illustratively displays a column header filter. The column filter header can, in one example, take the form as a filter pane that is specific to the corresponding column In another example, the column header filter is a filter mechanism that allows user 108 to provide more detailed filter criteria that specifically correspond to the corresponding column.

In the embodiment shown in FIG. 3I, for instance, user 108 has actuated the column filter component 260 for the "First Name" column in grid 162. In that case, column filter component 136 generates a column header filter display, such as drop down menu 268. It can be seen in FIG. 3I that drop down menu 268 can include a sort section 270 that allows user 108 to specify the way in which the corresponding results are sorted. Since the first name column is a textual column, sort mechanism 270 allows user 108 to select that the results be sorted in alphabetical order or in reverse alphabetical order. This is only one example of various sort criteria that can be used.

Drop down menu 268 also includes a column header filter portion 272. Filter portion 272 includes a filter operator selector 274 and a filter mechanism 276 that allows the user to enter a character string for filtering. When the user actuates mechanism 274, operators that are specific to the field or column that the user is filtering on, will be presented. Since the "First Name" column contains a string, then the operators displayed when the user actuates mechanism 274 are specific to that type of field.

Figure 3J:
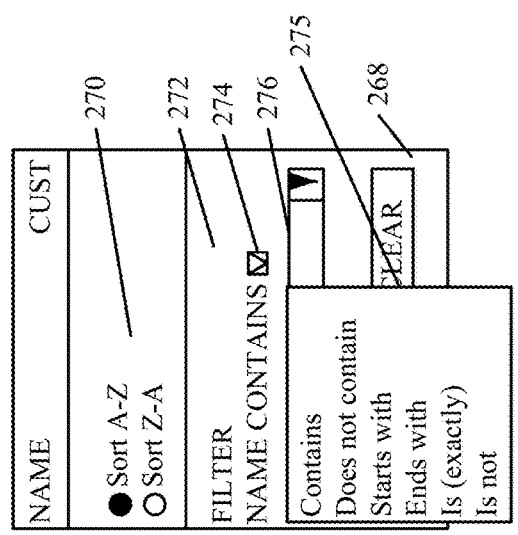

FIG. 3J shows one embodiment of a drop down menu 275 that can be generated when the user actuates mechanism 274. It can be seen that the operators in drop down menu 275 are specific to the type of fields in the "Name" column. It can also be seen in FIG. 3J that the user has selected the "contains" operator, but a variety of other operators are included as well. In the example shown in FIG. 3J, the operators also include "does not contain", "starts with", "ends with", "is (exactly)", and "is not".

Receiving the filter criteria as characters in filter mechanism 276 is indicated by block 280 in the flow diagram of FIG. 2. Receiving user actuation of the filter operator mechanism 274 is indicated by block 282 in the flow diagram of FIG. 2. Displaying the user selectable field type-specific natural language values or operators is indicated by block 284 and receiving user selection of a value or operator for the filter mechanism is indicated by block 286.

It will be noted that, in one embodiment, a column header filter mechanism can include multiple different types of filters. Therefore, in one embodiment, the user can enter filter criteria into multiple different filters before applying the column header filter. This is indicated by block 288 in the flow diagram of FIG. 2.

At some point, the user will be finished entering the filter criteria and will actuate the "Apply" user input mechanism 290. Receiving the "Apply" input is indicated by block 292 in FIG. 2.

Column filter component 136 then filters the corresponding column in grid 162 based upon the filter criteria input into the column header filter. This can be done in a variety of different ways. For instance, where the user has entered characters into a filter mechanism, those characters are compared against the entries in the corresponding column to find entries that contain those characters. Column filter component 136 can do this, applying the operator selected by the user as well.

In any case, applying the filter using the filter criteria is indicated by block 180 in the flow diagram of FIG. 2 and displaying the results is indicated by block 182.

It should also be noted that, in one example, user 108 can use multiple different filters to filter on the same grid. For instance, referring again to FIG. 3C, assume that the user has inserted the "ready for pickup" filter criteria into the "Status" filter mechanism 198. The user can then actuate the "Apply" user input mechanism 202. In that case, filter pane component 134 filters the results in grid 192 to only those results that have a status value of "ready for pickup". FIG. 3C shows that this results in only two entries in grid 192.

Figure 3K:
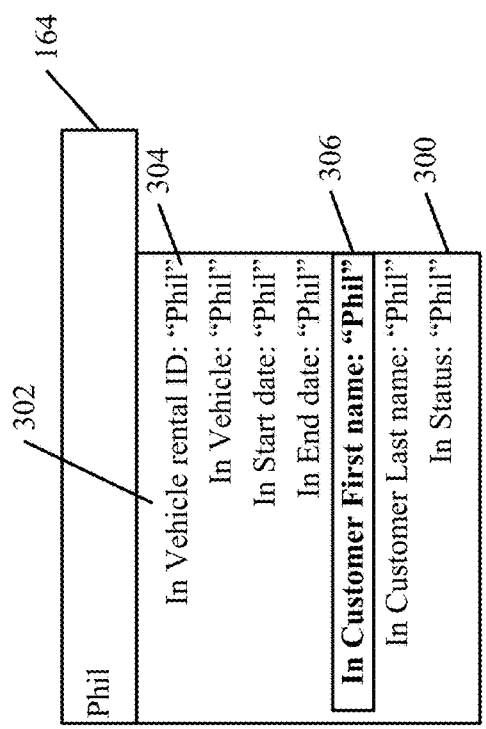

Assume then that the user uses mechanism 164 and begins typing the letters "phil". This is shown in FIG. 3K. In that embodiment, grid-based filter component 132 will illustratively generate drop down menu 300. Drop down menu 300 is similar to drop down menu 170 shown in FIG. 3B. That is, it includes a set of field identifiers 302 that identify the various fields or columns in grid 192, and it also includes the character string at 304 that has been entered by user 108 into filter mechanism 164. Each of the items in menu 302 are illustratively selectable. It can be seen that the user is selecting the entry 306 which causes grid-based filter component to filter the results in grid 192 to those that contain the letter string "phil" in the "Customer First Name" field or column The result is shown in FIG. 3L. It can thus be seen that user 108 has used multiple different filter mechanisms described herein, in order to filter grid 192 using multiple different filter criteria.

Each of the filter components discussed herein can allow user 108 to more quickly and intuitively retrieve relevant information from a computer system. They can also allow user 108 to do this without having to know the internal data structure of the computer system or what particular tables are called or how they are identified. In addition, the user need not necessarily understand combinatorial logic terms or operators. Instead, the filter system 116, itself, presents these operators to the user. They can be presented in a field-specific way so that the operators that most effectively operate on the type of data entered into a given field or column in a grid will be presented for selection by the user. This can reduce the amount of computing overhead needed to perform filtering, because the filtering system will not be attempting to apply operators in way in which they are not normally used. It may also reduce the number of errors that will be encountered or returned by the filter system. Further, it can reduce the amount of memory needed in the computer system, because the filtered results will be more quickly pared down to those desired by the user, so that they need not be held in short term memory.

Figure 4:
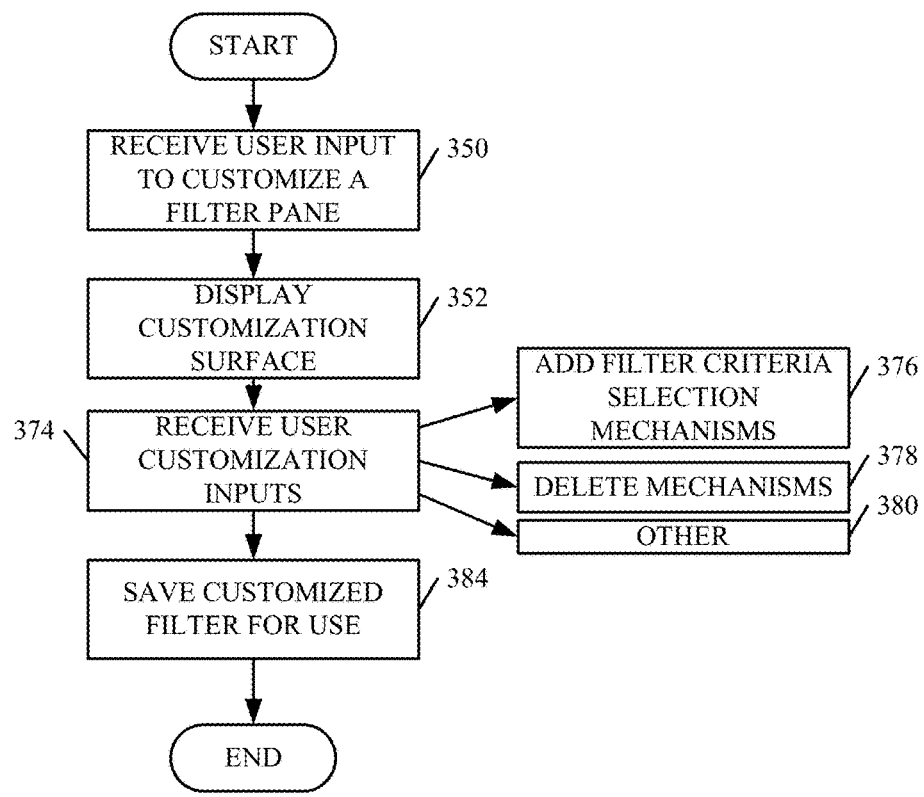
FIG. 4 is a flow diagram illustrating one example of the operation of the system shown in FIG. 1 in customizing a filter pane.

FIG. 4 is a flow diagram illustrating one example of the operation of customization component 138 in allowing a user to customize a filter mechanism. In the example discussed with respect to FIG. 4, the user is customizing a filter pane. However, in another embodiment, the user can customize a column header filter as well.

Customization component 138 first receives a user input indicating that the user wishes to customize a filter pane. This is indicated by block 350 in FIG. 4. Customization component 138 can receive this information in a variety of different ways. For instance, user 108 may provide an input gesture that is recognized by customization component 138 as a gesture indicating that the user wishes to customize a filter pane. The user can provide the input by actuating a customization user input mechanism, or by providing a wide variety of other inputs.

In one embodiment, the user also identifies a particular grid for which the user wishes to customize a filter pane. For instance, the user may identify the "Customers" form in business system 102 and indicate that the user wishes to customize a filter pane for filtering data displayed on the "Customers" form. This is only one example.

Figure 4A:
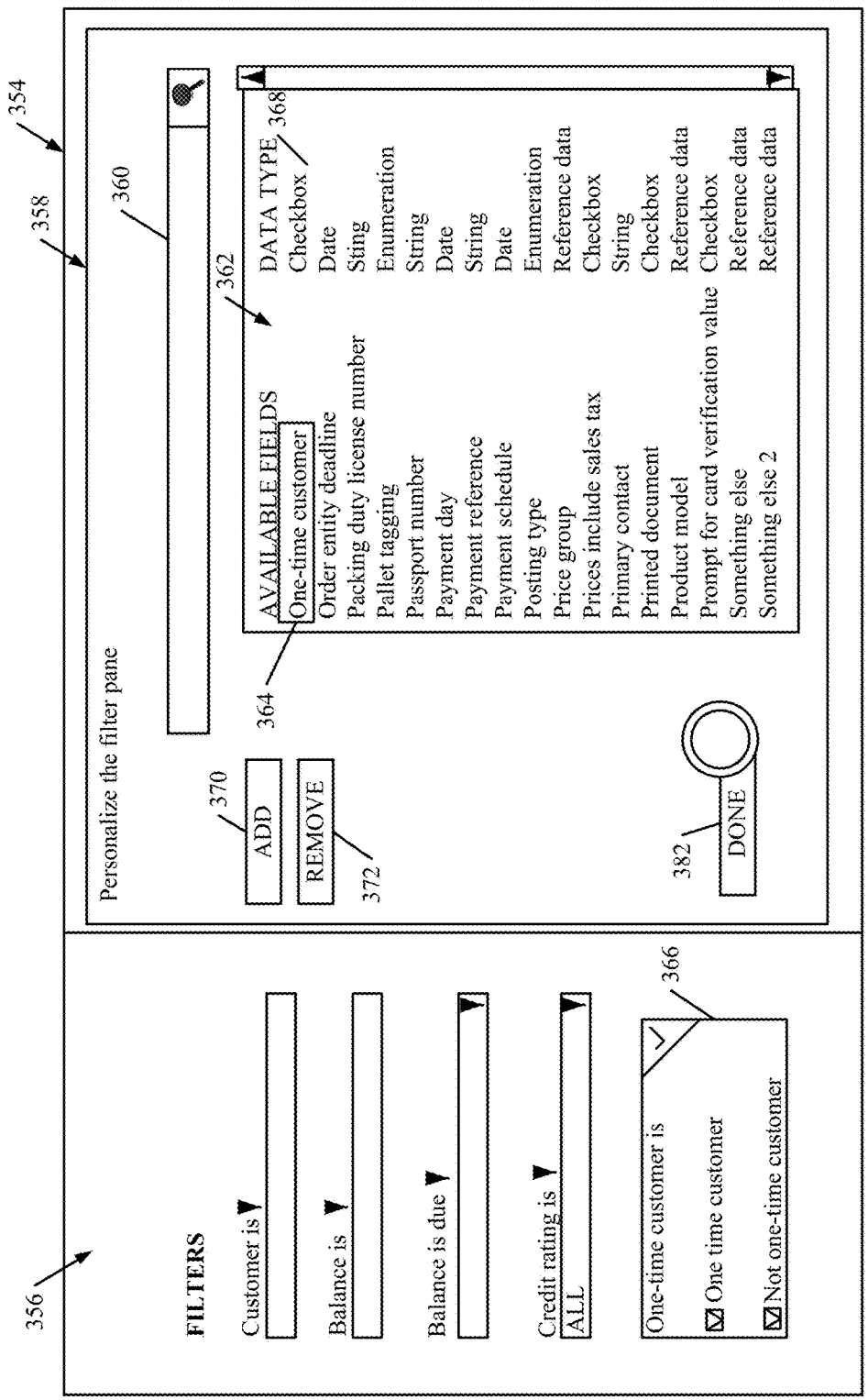
FIG. 4A shows one example of a user interface display.

In response, customization component 138 controls visualization system 118 to display a customization surface. This is indicated by block 352 in FIG. 4. FIG. 4A shows one example of such a surface.

FIG. 4A shows one example of a customization surface 354 that can be displayed to allow user 108 to customize a filter pane. In the example shown in FIG. 4A, customization component 138 is already displaying a filter pane 356. Filter pane 356 can be a filter pane that the user 108 has already customized, or it can be a preexisting filter pane that serves as a starting point for customization by user 108. User interface display 354 also includes a customization portion 358. Customization portion 358 includes a search mechanism 360 that allows the user to search for various filter mechanisms. It also includes a view portion 362 that allows the user to view a wide variety of different filter mechanisms that can be added to filter pane 356.

In the example shown, portion 362 identifies the particular fields on the selected grid that have corresponding filter mechanisms. It also illustratively identifies the data type for that particular field. It can be seen that the user has selected the "one-time customer" field 364. In that case, customization component 138 displays the corresponding filter mechanism 366 on filter pane 356. It can be seen that the filter mechanism 356 corresponding to the "one-time customer" field will allow the user to filter that field based upon whether the customer is a one-time customer or not. This can be done by the user selecting one or more "check boxes". Thus, in section 362, the data type for the filter mechanism is identified at 368 as check box. If the user wishes to have the filter mechanism 366 corresponding to the "one-time customer" field 364, the user can then actuate the add mechanism 370 and customization component 138 adds that filter mechanism 366 to the filter pane 356 for the corresponding grid.

In one example, user 108 can also select a filter mechanism on pane 356 and actuate the "remove" input mechanism 372. In that case, customization component 138 removes that particular filter mechanism from filter pane 356.

Receiving user customization inputs is indicated by block 374 in the flow diagram of FIG. 4. As discussed, those inputs can add filter mechanisms as indicated by block 376. They can delete filter mechanisms as indicated by block 378, or they can be other customization inputs as indicated by block 380.

When the user is finished customizing filter pane 356, the user can indicate this by actuating a suitable user input mechanism, such as mechanism 382. Customization component 138 then saves that filter pane, as customized by user 108. This is indicated by block 384 in the flow diagram of FIG. 4. The customized filter pane will then be used by filter pane component 134 each time the corresponding grid is displayed.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands. The input mechanisms can sense haptic or movement of the device (such as shaking or rotating the device). Also, the "displays" can include or comprise audible or haptic outputs as well.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
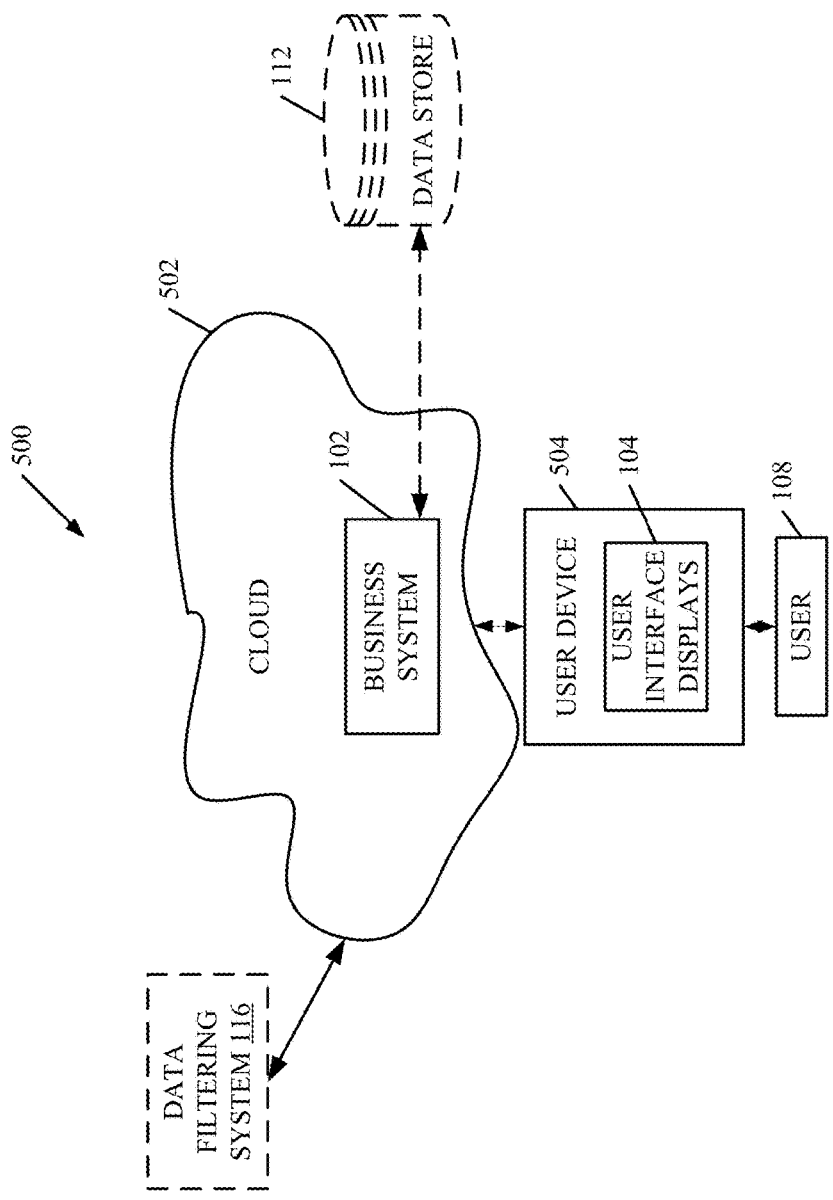
FIG. 5 is a block diagram of one example of the system illustrated in FIG. 1, deployed in a cloud computing architecture.

FIG. 5 is a block diagram of system 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of system 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 5, some items are similar to those shown in FIG. 1 and they are similarly numbered. FIG. 5 specifically shows that business system 102 can be located in cloud 502 (which can be public, private, or a combination where portions are public while others are private). Therefore, user 108 uses a user device 504 to access those systems through cloud 502.

FIG. 5 also depicts another embodiment of a cloud architecture. FIG. 5 shows that it is also contemplated that some elements of system 100 can be disposed in cloud 502 while others are not. By way of example, data store 112 can be disposed outside of cloud 502, and accessed through cloud 502. In another embodiment, data filtering system 116 can also be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that system 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
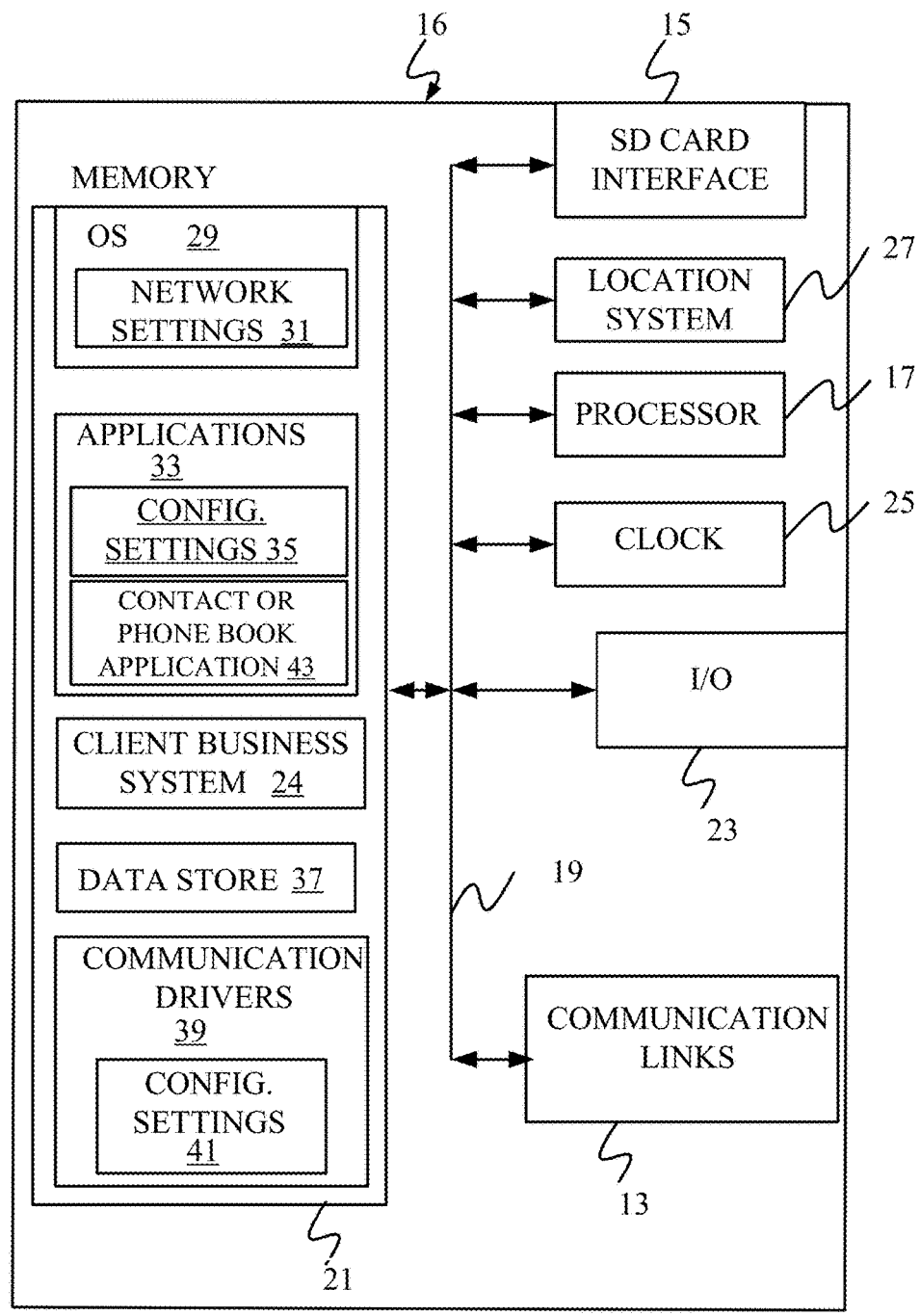
FIGS. 6-8 show various examples of mobile devices.
Figure 7:
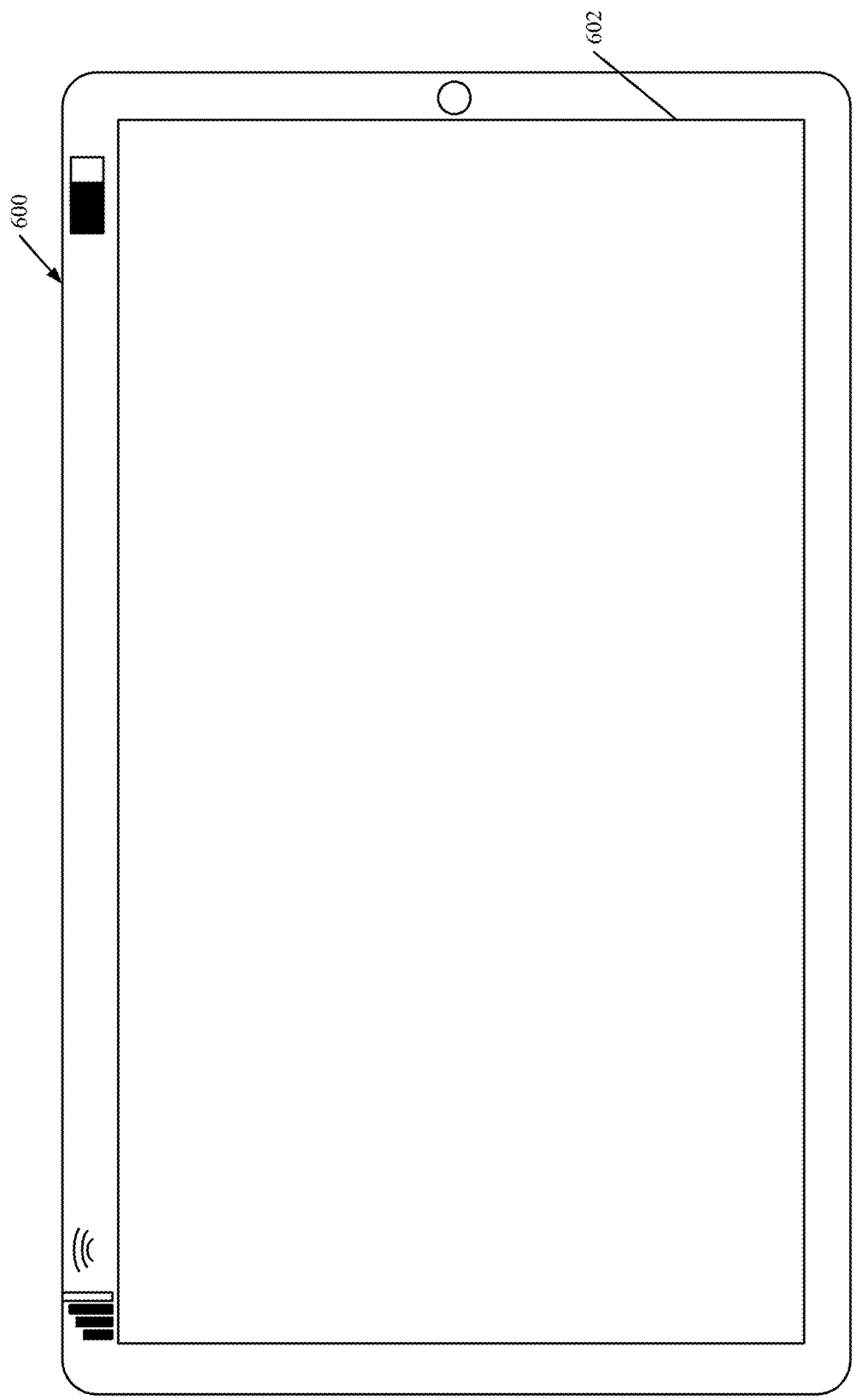
Figure 8:
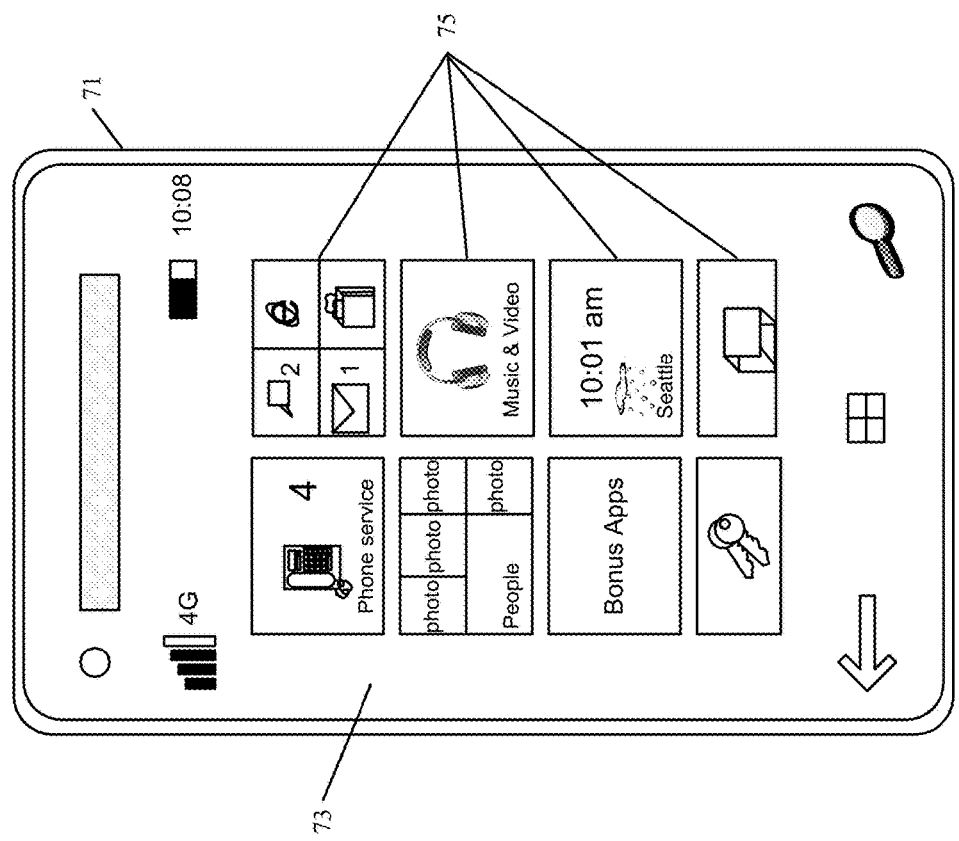

FIG. 6 is a simplified block diagram of one illustrative embodiment of a handheld or mobile computing device that can be used as a user's or client's hand held device 16, in which the present system (or parts of it) can be deployed or which can be used to access system 100. FIGS. 7-8 are examples of handheld or mobile devices.

FIG. 6 provides a general block diagram of the components of a client device 16 that can run components of system 100 or that interacts with system 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processor 110 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, scanners, RFID readers, QR code readers, fingerprint or retinal scanners, accelerometers and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client business system 24 which can run various business applications or embody parts or all of system 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one embodiment in which device 16 is a tablet computer 600. In FIG. 7, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices that can be used will be discussed as well. A smart phone or mobile phone can be provided as the device 16. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some embodiments, the phone can also includes a Secure Digital (SD) card slot that accepts a SD card.

The mobile device can also be a personal digital assistant (PDA) or a multimedia player or a tablet computing device, etc. (hereinafter referred to as PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. Although not shown, the PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 8 is an example of a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
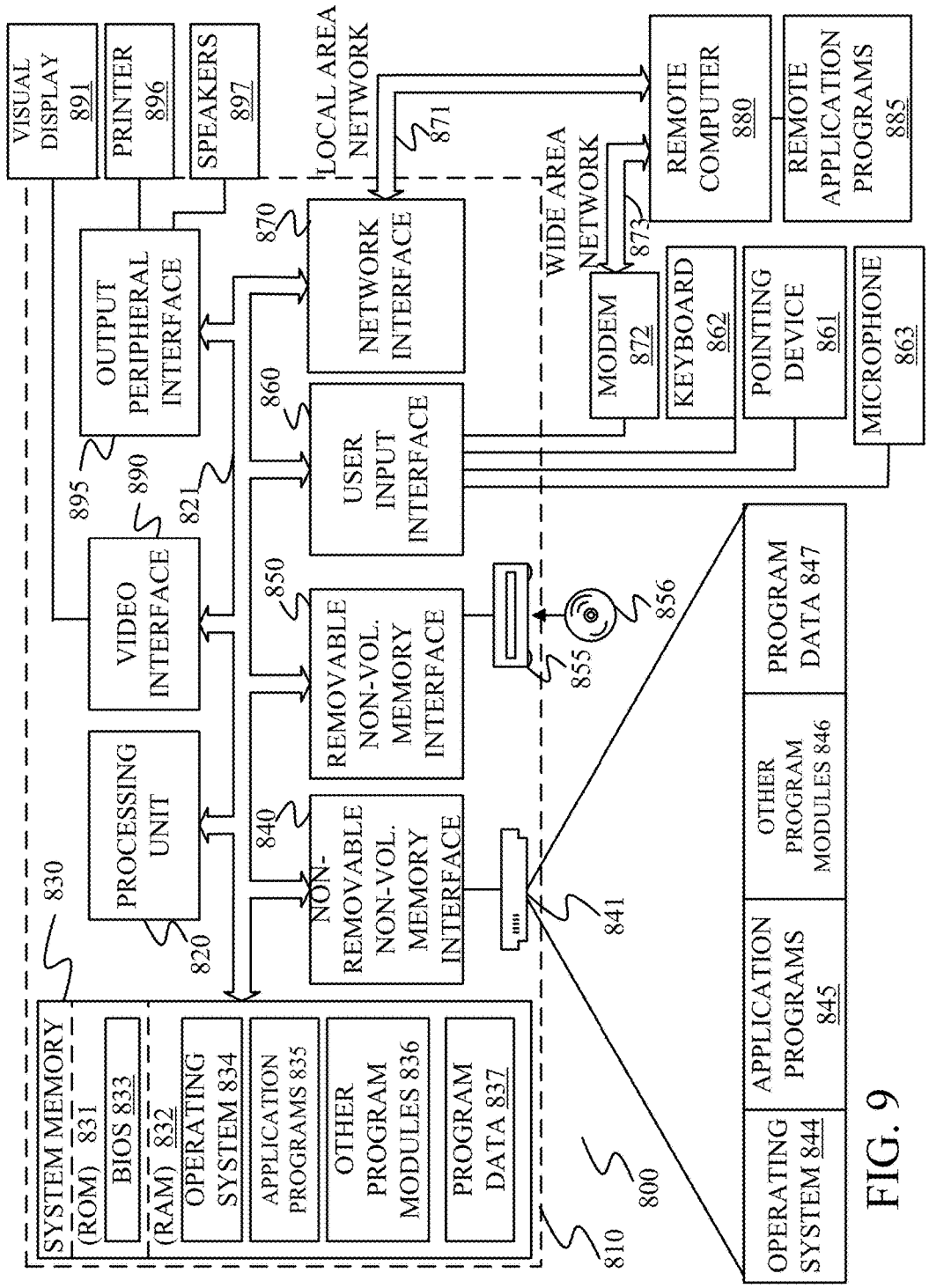
FIG. 9 is a block diagram of one example of a computing environment.

FIG. 9 is one embodiment of a computing environment in which system 100, or parts of it, (for example) can be deployed. With reference to FIG. 9, an exemplary system for implementing some embodiments includes a general-purpose computing device in the form of a computer 810. Components of computer 810 may include, but are not limited to, a processing unit 820 (which can comprise processor 110), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
a visualization system configured to receive a data access user input and display a filter user input mechanism and a collection of data records, having data display portions, based on the data access user input; and
a data filtering system configured to receive a filter user input through filter user input mechanism, indicative of filter criteria, and identify data display portions that meet the filter criteria, the visualization system being configured to display a selectable display element, in the filter user input mechanism, corresponding to each identified data display portion, the data filtering system being configured to receive selection of a given selectable display element corresponding to a given identified data display portion and to filter the displayed collection to show only data records for which the given identified display portion meets the filter criteria.

Example 2 is the computing system of any or all previous examples wherein the visualization system is configured to display the collection of data records in a grid display and wherein the data display portions comprise fields in the grid display.

Example 3 is the computing system of any or all previous examples wherein the visualization system comprises:
a grid based filter component that filters data displayed in the fields on the grid, based on the filter criteria.

Example 4 is the computing system of any or all previous examples wherein the filter user input mechanism comprises a text box and wherein the gird based filter component is configured to identify the data display portions as characters are input into the text box and wherein the visualization system is configured to modify the selectable display elements that are displayed as the data filtering system identifies the data display portions.

Example 5 is the computing system of any or all previous examples wherein the fields in the grid display are arranged in a plurality of different columns and wherein the data filtering system comprises:
a column filter component configured to generate a column filter input mechanism, corresponding to each of the plurality of different columns, that is actuated to receive column filter criteria.

Example 6 is the computing system of any or all previous examples wherein each column displays a type of data in the grid display and wherein the column filter component is configured to generate each given column filter input mechanism to display a plurality of user selectable, data type-specific values that, when selected, are applied to filter criteria entered in the given column filter input mechanism.

Example 7 is the computing system of any or all previous examples wherein the column filter component is configured to filter the data records displayed in the grid display to identify data records that meet the column filter criteria and wherein the visualization system displays only the identified data records that meet the column filter criteria in the grid display.

Example 8 is the computing system of any or all previous examples wherein each column has a column header portion, and wherein the column filter component is configured to generate a column filter actuator corresponding to each column header portion in the grid display and to generate the column filter input mechanism in response to user actuation of the column filter actuator.

Example 9 is the computing system of any or all previous examples wherein the data filtering system comprises:

a filter pane component configured to generate a filter pane display with a different filter input mechanism corresponding to each display portion in the grid display.

Example 10 is the computing system of any or all previous examples wherein the display portions each display a type of data and wherein the filter pane component is configured to receive actuation of a given filter input mechanism corresponding to a given display portion in the grid display and, in response, display a set of selectable filter values specific to the type of data displayed in the given display portion.

Example 11 is the computing system of any or all previous examples wherein the filter pane component displays the set of selectable filter values as selectable operators applied to filter criteria entered in the given filter input mechanism.

Example 12 is the computing system of any or all previous examples wherein the data filtering system comprises:

a customization component configured to generate a customization user input mechanism that is actuated to customize a selected filter user input mechanism to include one or more selected filter criteria input mechanisms.

Example 13 is the computing system of any or all previous examples wherein the customization component is configured to generate the customization user input mechanism with a search mechanism that is actuated to receive a search input and display a set of filter criteria input mechanisms for selection, based on the search input.

Example 14 is the computing system of any or all previous examples wherein the customization user input mechanism is actuated to receive a grid identifier that identifies a grid display for which the customized filter input mechanism is generated.

Example 15 is a method, comprising:

displaying a filter user input mechanism and a collection of data records, in a grid display, having data display portions, based on a data access user input;

receiving a filter user input through the filter user input mechanism, indicative of filter criteria;

identifying data display portions that meet the filter criteria;

displaying a selectable display element, in the filter user input mechanism, corresponding to each identified data display portion;

receiving user selection of a given selectable display element corresponding to a given data display portion; and filtering the displayed collection to show only data records for which the given data display portion meets the filter criteria.

Example 16 is the method of any or all previous examples wherein the display portions comprise a plurality of different columns, wherein each column displays a type of data and wherein displaying the filter user input mechanism comprises:

generating a column filter input mechanism, corresponding to each of the plurality of different columns, that is actuated to receive column filter criteria, each given column filter input mechanism displaying a plurality of user selectable, data type-specific values that, when selected, are applied to filter criteria entered in the given column filter input mechanism.

Example 17 is the method of any or all previous examples wherein displaying the filter user input mechanism comprises:

displaying a filter pane display with a different filter input mechanism corresponding to each display portion in the grid display, wherein the display portions each display a type of data and wherein, in response to actuation of a given filter input mechanism corresponding to a given display portion in the grid display, displaying a set of selectable filter values specific to the type of data displayed in the given display portion.

Example 18 is the method of any or all previous examples and further comprising:

displaying a customization user input mechanism that is actuated to customize a selected filter user input mechanism to include one or more selected filter criteria input mechanisms.

Example 19 is a computer readable storage medium having computer executable instructions which, when executed by a computer, cause the computer to perform a method, comprising:

displaying a collection of data records, in a grid display, having data display portions, based on a data access user input;

displaying a first filter input mechanism that is actuated to receive filter criteria that are applied to all of the data display portions in the grid display;

displaying a second filter input mechanism that is actuated to receive filter criteria that are applied to a subset of the data display portions in the grid display;

receiving filter criteria through one of the first and second filter input mechanisms; and filtering the displayed collection to show only data records for which data display portions to which the filter criteria are applied meet the filter criteria.

Example 20 is the computer readable storage medium of any or all previous examples wherein the data display portions each display a type of data and further comprising:

in response to receiving user actuation of the second filter input mechanism, displaying a plurality of different user selectable filter criteria values that vary based on the type of data displayed in the subset of data display portions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
a processor; and
memory storing instructions executable by the processor, wherein the instructions configure the computing system to:
generate a representation of a user interface display that includes:
a filter user input mechanism, and
a collection of data records each having a data structure that defines a plurality of data fields, each data field having an associated data field type;

based on an indication of a filter user input through the filter user input mechanism, identify a filter criterion;
perform a first filter operation that applies the filter criterion to data in the plurality of data fields and selects a subset of the data fields that includes data that meets the filter criterion, the subset representing some, but not all, of the data field types;
generate a representation of a filter menu on the user interface display, the filter menu including selectable display elements that represent the selected subset, wherein each display element,
corresponds to a different one of the data field types in the selected subset, and
includes an indication of the corresponding data field type;
based on an indication of a selection user input, select one of the display elements that corresponds to a particular one of the data field types;
perform a second filter operation to filter the collection of data records by applying the filter criterion to the data fields of the particular data field type that corresponds to the selected display element; and
modify the representation of the user interface display based on the filtered collection of data records.

2. The computing system of claim 1 wherein the instructions configure the computing system to:
generate the representation of the user interface display with the collection of data records in a grid display.

3. The computing system of claim 2 wherein the filter user input mechanism comprises a text box and wherein the instructions configure the computing system to:
receive an indication of a character string through the text box, the character string comprising at least one of:
a numerical value; or
a nonnumerical value; and
define the filter criterion based on the character string.

4. The computing system of claim 3, wherein the instructions configure the computing system to:
in response to an indication of a first character in the character string, selecting the subset of data fields as a first subset; and
in response to an indication of a second character in the character string, that is subsequent to the first character, selecting, a second subset of data fields that is different than the first subset and includes data that meets the first and second character; and
updating the filter menu to including selectable display elements that represents the second subset of the data fields.

5. The computing system of claim 1, wherein
the data fields in the grid display are arranged in a plurality of different columns, wherein each column includes a type of data in the grid display, and
the selectable display elements comprise a plurality of column filter input mechanisms, each column filter input mechanism corresponding to one of the plurality of different columns, and
the instructions configure the computing system to:
based on an indication of actuation of a particular one of the column filter input mechanisms, generate a column-specific filter criterion based on the filter criterion.

6. The computing system of claim 5 wherein the instructions configure the computing system to:
filter the data records displayed in the grid display to identify data records that meet the column filter criterion, and wherein the modified representation of the user interface display includes only the identified data records that meet the column-specific filter criterion in the grid display.

7. The computing system of claim 6 wherein each column has a column header portion, and wherein the instructions configure the computing system to:
generate a column filter actuator corresponding to each column header portion in the grid display and to generate the column filter input mechanism in response to an indication of user actuation of the column filter actuator.

8. The computing system of claim 4 wherein the instructions configure the computing system to:
generate a filter pane display with a different filter input mechanism corresponding to each data field in the grid display.

9. The computing system of claim 8 wherein the data fields each display a type of data and wherein the instructions configure the computing system to:
receive an indication of actuation of a given filter input mechanism corresponding to a given data field in the grid display and, in response, generate a set of selectable filter values specific to the type of data displayed in the given data field.

10. The computing system of claim 9 wherein the filter pane component displays the set of selectable filter values as selectable operators applied to filter criterion entered in the given filter input mechanism.

11. The computing system of claim 8 wherein the instructions configure the computing system to:
generate a customization user input mechanism; and
in response to an indication of user actuation of the customization user input mechanism, customize a selected filter user input mechanism to include one or more selected filter criteria input mechanisms.

12. The computing system of claim 11 wherein the instructions configure the computing system to:
receive a search input and generate a set of filter criteria input mechanisms based on the search input.

13. The computing system of claim 11 wherein the instructions configure the computing system to:
receive a grid identifier that identifies a grid display; and
generate the customized filter input mechanism based on the identified grid display.

14. A computer-implemented method, comprising:
based on an indication of a data access user input, generating a representation of a user interface display that includes a filter user input mechanism and a collection of data records in a grid display, the collection of data records having a set of data fields, each data field having an associated field type;
based on an indication of a filter user input through the filter user input mechanism, identifying a filter criterion;
identifying a subset of the data fields by performing a first filter operation that filters the set of data fields based on the filter criterion relative to data in the data fields;
generating a representation of a set of selectable display elements in association with the filter user input mechanism on the user interface display, wherein each display element, in the set of selectable display elements,
corresponds to a different one of the data fields in the subset of data fields, and
includes an indication of the field type associated with the corresponding data field;
based on an indication of a user selection input, selecting one of the display elements;

performing a second filter operation to filter the collection of data records by applying the filter criterion to the data field that corresponds to the selected display element; and modifying the representation of the user interface display based on the filtered collection of data records.

15. The method of claim 14 wherein the data fields comprise a plurality of different columns, and further comprising:

generating a plurality of column filter input mechanisms, each column filter input mechanism corresponding to one of the plurality of different columns, that is actuated to generate column filter criterion, each column filter input mechanism displaying a plurality of user selectable, data type-specific values that, when selected, are applied to filter criterion entered in the column filter input mechanism.

16. The method of claim 15, and further comprising:
generating a filter pane display with a different filter input mechanism corresponding to each data field in the grid display, and wherein, in response to actuation of a given filter input mechanism corresponding to a given data field in the grid display, generating a set of selectable filter values specific to the type of data displayed in the given data field.

17. The method of claim 16 and further comprising:
generating a customization user input mechanism; and
based on an indication of actuation of the customization user input mechanism, customizing a selected filter user input mechanism to include one or more selected filter criteria input mechanisms.

18. A computer-implemented method comprising:
generating a representation of a user interface display that includes a filter user input mechanism and a collection of data records in a grid display,
each data record having a set of data fields arranged in columns, and
each column having an associated data field type;
receiving an indication of a character string through the filter user input mechanism;
defining a filter criterion that comprises the character string;
automatically performing a first filter operation that applies the filter criterion to data in all of the data fields and selects a subset of the columns that includes data that meets the filter criterion, the subset including some, but not all, of the columns;
automatically generating a filter menu on the user interface display, the filter menu including selectable display elements representing the selected subset of the columns, wherein each display element,
corresponds to a different one of the columns in the selected subset, and
includes an indication of the data field type associated with the corresponding column;
based on an indication of a selection user input, selecting one of the display elements that corresponds to a particular one of the columns;
performing a second filter operation to filter the collection of data records by applying the filter criterion, as a column-specific filter criterion, to the data fields in the particular column that corresponds to the selected display element; and
modifying the representation of the user interface display to include the filtered collection of data records.

19. The computer-implemented method of claim 18, and further comprising:
in response to receiving user actuation of a second filter input mechanism, generating a plurality of different user selectable filter criteria values that vary based on the associated field type displayed in the subset of columns.

20. The computer-implemented method of claim 18, wherein the character string comprises at least one of a numerical value or a non-numerical value, and the filtered collection of data records includes only data records that have a data field that includes a value that matches the character string of the filter criterion.

* * * * *